(12) United States Patent
Mukai et al.

(10) Patent No.: US 9,512,378 B2
(45) Date of Patent: Dec. 6, 2016

(54) SLIDING MATERIAL BASED ON GRAPHITE-ADDED RESIN AND SLIDING MEMBER

(75) Inventors: Ryo Mukai, Kashima (JP); Hiromi Yokota, Toyota (JP); Akira Sawamoto, Toyota (JP); Takao Masamura, Toyota (JP); Masanori Akizuki, Toyota (JP)

(73) Assignee: TAIHO KOGYO CO., LTD., Toyota-shi, Aichi (JP)

( * ) Notice: Subject to any disclaimer, the term of this patent is extended or adjusted under 35 U.S.C. 154(b) by 1071 days.

(21) Appl. No.: 13/639,367

(22) PCT Filed: Apr. 7, 2011

(86) PCT No.: PCT/JP2011/058824
§ 371 (c)(1),
(2), (4) Date: Jan. 22, 2013

(87) PCT Pub. No.: WO2011/126078
PCT Pub. Date: Oct. 13, 2011

(65) Prior Publication Data
US 2013/0116157 A1   May 9, 2013

(30) Foreign Application Priority Data

Apr. 8, 2010  (JP) .................................. 2010-089916

(51) Int. Cl.
*C10M 103/02* (2006.01)
*C10M 111/04* (2006.01)
(Continued)

(52) U.S. Cl.
CPC ............. *C10M 111/04* (2013.01); *C08G 73/10* (2013.01); *C08G 73/14* (2013.01); *C08L 79/08* (2013.01); *C10M 125/02* (2013.01); *C10M 2201/041* (2013.01); *C10M 2201/061* (2013.01); *C10M 2201/066* (2013.01); *C10M 2201/087* (2013.01);

(Continued)

(58) Field of Classification Search
USPC .................................................. 508/108, 109
See application file for complete search history.

(56) References Cited

U.S. PATENT DOCUMENTS 4,898,905 A   2/1990   Kawakami et al.
5,498,654 A   3/1996   Shimasaki et al.

FOREIGN PATENT DOCUMENTS

EP   0450847 A1    10/1991
JP   5-331314 A    12/1993

(Continued)

OTHER PUBLICATIONS

International Search Report for PCT/JP2011/058824, mailing date of May 24, 2011.

(Continued)

*Primary Examiner* — Ellen McAvoy
*Assistant Examiner* — Chantel Graham
(74) *Attorney, Agent, or Firm* — Westerman, Hattori, Daniels & Adrian, LLP

(57) ABSTRACT

A sliding material based on graphite-added resin containing 5 to 60% by weight of graphite particles having an average particle diameter of from 5 to 50 μm, and a degree of graphitization of 0.6 or more, with the balance being one or more of polyimide resin and polyamide-imide resin, and further, the number of the graphite particles having a minimum diameter/maximum diameter ratio (hereinafter referred to as "particle ratio") of 0.5 or more amounts to 50% or more of the total number of the graphite particles observed in a photograph of an optional cross section of the sliding material based on graphite-added resin.

17 Claims, 2 Drawing Sheets

(51) Int. Cl.
  *C08G 73/10* (2006.01)
  *C08G 73/14* (2006.01)
  *C08L 79/08* (2006.01)
  *C10M 125/02* (2006.01)

(52) U.S. Cl.
  CPC .. *C10M 2201/103* (2013.01); *C10M 2213/062* (2013.01); *C10M 2217/0403* (2013.01); *C10M 2217/0415* (2013.01); *C10M 2217/0443* (2013.01); *C10N 2220/082* (2013.01); *C10N 2230/06* (2013.01); *C10N 2250/14* (2013.01); *C10N 2250/141* (2013.01); *C10N 2250/18* (2013.01)

(56) References Cited

FOREIGN PATENT DOCUMENTS

| | | |
|---|---|---|
| JP | 7-223808 A | 8/1995 |
| JP | 7-223809 A | 8/1995 |
| JP | 2517604 B2 | 7/1996 |
| JP | 3026269 B2 | 3/2000 |

OTHER PUBLICATIONS

Notification of Transmittal of Translation of the International Preliminary Report on Patentability (Form PCT/IB/338) (1 page) of International Application No. PCT/JP2011/058824 mailed Nov. 15, 2012 with Forms PCT/IB/373 (1 page) and PCT/ISA/237 (6 pages).

SLIDING MATERIAL BASED ON GRAPHITE-ADDED RESIN AND SLIDING MEMBER

TECHNICAL FIELD

The present invention relates to sliding material based on graphite-added resin; that is, polyimide and/or polyamide-imide, to which graphite is added. The present invention also relates to a sliding member.

BACKGROUND OF THE INVENTION

A phenol-resin based sliding material had been used before filing of Patent Document 1, Japanese Patent No. 2517604. The present applicant proposed in Patent Document 1 a sliding material, which replaces the former sliding material and consists of 20 to 90% by weight of at least one of polyimide and polyamide-imide, 5 to 60% by weight of graphite, and 0.5 to 20% by weight of a friction-adjusting agent consisting of clay. Patent Document 1 describes the graphite as follows.

Graphite bonded with polyimide or polyamide-imide mainly imparts improved friction characteristics to the sliding material. Graphite used for such a purpose may be either synthetic or natural. Particle shape of graphite may be granular or flat. From a view point of wear resistance, graphite has preferably 250 μm or less of particle diameter. A crystalline property of the graphite is expressed in terms of d(002) plane distance measured by X ray. From the view point of wear resistance, a preferable distance is 3.50 angstroms or less. The graphite having the plane distance mentioned above is liable to cleave at intervals of the distances mentioned above. When graphite is flaky or has scale form, flat major surfaces of the graphite are aligned on the surface of sliding material. Therefore, the area of the graphite that is on the surface of sliding material is large, and coefficient of friction is advantageously reduced. Graphite is used in an amount of 5 to 60%. When this amount is less than 5%, coefficient of friction of the sliding material is so high and hence wear amount is large. On the other hand, when this amount exceeds 60%, bonding strength of resin and bonding strength between the backing metal and sliding layer are weakened, so that the amount of wear increases. The amount of use is preferably 30 to 60%.

Patent Document 2, Japanese Patent No. 3026269 relates to a polyamide-imide resin based sliding material proposed by the present applicant. Heat-treated resin particles, which are essentially individually separated from each other, are dispersed in an amount of 5 to 80% by weight in the aromatic polyamide-imide of the sliding material. Carbon may be added as an optional component. The carbon is described as follows.

Carbon improves wear resistance and decreases coefficient of friction. The carbon can be any one of such amorphous carbons as carbon black, coke powder, and glass-like carbon, and crystalline carbons such as synthetic carbon or natural carbon (graphite). Amorphous carbon is recommended in the light of wear resistance, while crystalline carbon is recommended in light of friction characteristics. Therefore, either amorphous carbon or crystalline carbon is used depending upon the application. When the carbon content is less than 1%, neither wear-resistance nor friction characteristics is effectively improved. On the other hand, when the carbon content exceeds 60%, the mechanical properties are impaired, and coefficient of friction is liable to be instable due to carbon separation. Therefore, the carbon content must be 1 to 60%. Carbon content is preferably 5 to 50%. Average particle diameter of carbon is preferably 250 μm or less. When coarse carbon having average particle diameter more than 250 μm and fine carbon are compared with each other, provided that the carbon content is identical for both cases, the exposed area of the former carbon on the sliding surface is less than that of the latter carbon, which is not effective for improving sliding properties. Average particle diameter of carbon is preferably 10 to 40 μm.

Patent Document 3, Japanese Unexamined Patent Publication (kokai) No. Hei 5-331314 proposes a heat-resistant resin sliding material consisting of 40 to 95% by weight of heat-resistant resin such as polyimide resin, and 5 to 60% by weight of spherical graphite having 3 to 40 μm of average particle diameter. Resin-based spherical particles are fired in an inert gas atmosphere or under vacuum to graphitize the same. The spherical graphite and heat resistant resin are blended to provide a composition of the sliding material. The spherical graphite is described as follows.

The spherical graphite herein has a uniform particle diameter, and it is 3 to 40 μm in average. Highly geometrically spherical graphite is preferred. Starting material of the spherical graphite is preferably at least one of phenol resin, naphthalene resin, furan resin, xylene resin, divinylbenzene polymer, and styrene-divylbenzene copolymer. A production method of such spherical graphite comprises emulsion polymerizing these starting materials by known method to form spherical particles, and firing these spherical particles under an inert gas atmosphere, such as nitrogen gas or argon gas, or under vacuum. As a result, carbonization and/or graphitization occur and the spherical graphite is obtained.

The technical level of the sliding material based on graphite-added resin is revealed from Patent Documents 1 through 3 and is illustrated from the following points of view.

(a) Graphite is a material having laminar crystalline structure, in which (002) planes are superimposed. The interlayer slipping is liable to occur. These properties are utilized in such a manner that cleavage planes of graphite are oriented to the sliding direction (Patent Document 1).

(b) As the degree of graphitization increases, the graphite becomes closer to natural graphite, which is soft and well lubricating. When the degree of graphitization is low, a resultant hard carbon is added as hard particles to enhance the wear resistance and to adjust friction. Since approximately geometrically spherical graphite proposed in Patent Document 3 is as hard as Hv800 to 1200, it is believed to be hard carbon.

(c) Approximately geometrically spherical graphite is obtained by firing resin, as described in, for example, Patent Documents 2 and 3. Natural graphite and synthetic graphite have conventionally been used for sliding materials. Contrary to the case of fired resin, since the shapes of natural graphite and synthetic graphite are considerably deformed from spherical graphite, these graphites have small particle ratio.

PRIOR ART DOCUMENTS

Patent Documents

Patent Document 1: Japanese Patent No. 2517604
Patent Document 2: Japanese Patent No. 3226290
Patent Document 3: Japanese Unexamined Patent Publication (kokai) No. Hei 5-331314

BRIEF SUMMARY OF THE INVENTION

Problems to be Solved by Invention

As shown in schematic drawing FIG. 1, scale-form or flaky graphite particles having a graphite crystal structure are arranged such that cleavage and sliding directions are coincident with each other. In this case, seizure resistance is improved. In the drawing, 1 denotes a cleavage plane, 2 denotes the graphite particles, and the arrow denotes a sliding direction. Referring to a schematic drawing FIG. 2, orientation of the graphite particles is not coincident with the sliding direction. In this case, seizure resistance is not improved.

The present inventors paid attention to the fact that orientation of graphite in the resin-based sliding material is not ideal as illustrated in FIG. 1. An object of the present invention is to overcome the problems attributable to the orientation as described above and to propose a sliding material based on graphite-added resin having improved seizure resistance.

Furthermore, the graphite having a scale form has a thin shape. In addition, the graphite is inherently brittle. Therefore, when the surface of a sliding material is machined, the graphite is broken into pieces and separates out of the sliding surface to roughen the same. It turns out that the seizure resistance is thus impaired. Therefore, another object of the present invention is to provide a sliding material based on graphite-added resin, having a machined surface with lessened roughness.

Means for Solving the Problem

A sliding material based on graphite-added resin according to the present invention is characterized in consisting of 5 to 60% by weight of graphite having an average particle diameter of 5 to 50 μm and a degree of graphitization of 0.6 or more of, with the balance of one or more of polyimide resin and polyamide-imide resin. When the graphite-added sliding material is photographed on an optional cross section to observe the graphite, the number of graphite particles having a minimum diameter/maximum diameter ratio (hereinafter referred to as "particle ratio") of 0.5 or more amounts to 50% or more of the total number of the observed graphite particles (hereinafter referred to as "the presence ratio"). The graphite fulfilling the particle ratio and presence ratio is hereinafter referred to as "the present graphite."

(1) Shape of Graphite

The shape of the present graphite is almost spherical. Therefore, the present graphite has a considerably higher presence ratio than the commercially available graphite in scale form, amorphous graphite having a soil-like appearance, flaky graphite and the like. Since the present graphite is almost spherical, it is liable to be uniformly dispersed in resin such as polyimide. In addition, since orientation of the present graphite in resin does not occur, cleavage liability does not differ depending upon the sliding direction. Although a high coefficient of friction is anticipated from absence of orientation or non-orientation of the graphite in the sliding material according to the present invention, the seizure resistance is outstandingly improved because the degree of graphitization is set to 0.6 or more. In the present graphite, the presence ratio is 50% more, that is, 50% or more; preferably 70% or more of the graphite particles have a particle ratio of 0.5 or more, with the balance being the graphite particles having a particle ratio of less than 0.5.

(2) Size of Graphite

When the average particle diameter of present graphite is less than 5 μm, coagulation of graphite occurs. On the other hand, when the average particle diameter exceeds 50 μm, the dispersion property of present graphite is impaired.

(3) Degree of Crystallization of Graphite

The present graphite has a degree of graphitization of 0.6 or more and is almost identical or identical with natural graphite. Therefore, the lubrication property of the present graphite is excellent. Preferably, the degree of graphitization is 0.8 or more.

(4) Amount of Graphite

When the content of present graphite is less than 5% by weight, low friction characteristics is not obtained and hence the seizure resistance is poor. On the other hand, when the content of present graphite exceeds 60% by weight, strength of the sliding material is lowered.

(5) Resin

The balance of the present graphite described hereinabove is polyimide (PI) and/or polyamide imide (PAI) resin. Polyester imide, aromatic polyimide, polyether imide, bismaleic imide in liquid form or solid powder form and the like can be used as the polyimide.

Aromatic polyamide-imide resin used in Patent Document 2 can be used as the polyamide-imide resin. Every one of these resins exhibits improved heat resistance and low coefficient of friction.

(6) Optional Components

One or more friction adjusting agents are selected from among clay, mullite and talc having particle diameter of less than 10 μm and may be contained as an optional component. Its amount is from 0.5 to 20% by weight, with a proviso that the total amount of friction adjusting agents and graphite is from 5.5 to 80% by weight.

Hard particle of clay, mullite and talc is utilized to enhance the wear resistance of a sliding layer. Clay encompasses general clay mineral which is based on $Al_2O_3$—$SiO_2$—$H_2O$. Calcined clay is particularly preferred. The calcined clay is obtained by preliminary calcination of the clay at a temperature lower than 500-600 degrees C. Mullite is $3Al_2O_3.2SiO_2$ obtained by calcining clay mineral and is hard matter as well. Talc is a pyrophyllite mineral which is a component of clay mineral, and is expressed by a composition form of $Mg_3Si_4O_{10}(OH)_2$.

When the content of these friction adjusting agents is less than 0.5% by weight, wear resistance is not satisfactorily improved. On the other hand, when their contents exceed 20% by weight, opposite material is damaged by the friction adjusting agent, which means unsatisfactory wear resistance of the opposite material. In addition, when the total amount of present graphite and friction adjusting agents exceeds 80% by weight, such drawbacks as insufficient heat resistance and strength become apparent. Content of the friction adjusting agent is preferably 5 to 15% by weight. In addition, when particle diameter of the friction adjusting agent exceeds 10 μm, its attacking property against the opposite material becomes severe.

The sliding material based on graphite-added resin according to the present invention may further contain at least one solid lubricant selected from PTFE, $MoS_2$ and BN, thereby improving the lubricating property. Its amount is 1 to 40% by weight, with a proviso that the total amount of present graphite and friction-adjusting agent amounts to 6.5 to 80% by weight. When the content of solid lubricant is less than 1% by weight, its effectiveness is small. On the other hand, when its content exceeds 40% by weight, or when total content of spherical graphite and friction-adjusting agent exceeds 80% by weight, such drawbacks as reduction in heat resistance and strength become appreciable. The $MoS_2$ and BN mentioned above have a cleavage property like graphite. However, they have not a spherical shape but flat sheet shape. Therefore, $MoS_2$ and BN are liable to orient in a sliding layer. Their cleavage property is almost constant in the sliding direction.

(7) Production Method

The sliding material based on graphite-added resin according to the present invention (hereinafter referred to as "the sliding material") may be monolithic or solid material. That is, the sliding material is used as itself for a sliding member. Alternatively, the sliding layer is baked on a backing metal to provide a sliding member. In addition, a bonding layer may be sandwiched between the backing metal and the sliding layer. A method for producing the sliding material is as explained in Patent Document 1, page 3, fifth column, line 9 to sixth column, line 4. Surface roughness of the sliding member according to the present invention can be adjusted by means of mechanical working, such as machining, polishing and grinding. The present graphite hardly separates out of the surface during mechanical working, and, therefore, the surface roughness is small, and, thus the seizure resistance can be further enhanced.

Effects of Invention (1) The sliding material according to the present invention is a non-oriented material free of graphite orientation. Crystalline property in terms of degree of graphitization is high. Therefore, graphite stably cleaves irrespective of its orientation. Consequently, various circumstances such as the shape and location of the sliding member, rotation or vibration of a shaft and the like do not exert influence upon cleavage. This is believed to result in improved seizure resistance.

(2) Since the present graphite has improved dispersion property, it can be uniformly dispersed in the resin.

(3) Since the graphite in scale form is thin, the graphite exposed on the surface of a sliding member is broken into pieces and is liable to separate from the surface of a sliding member during machining. Since such a thin portion is not found in a number of particles of the present graphite, the exposed portion of the graphite is entirely removed but is not locally broken into pieces. Therefore, surface roughness is so small that seizure resistance is improved (claim 6).

(4) Conventionally almost geometrically spherical graphite is obtained by firing resin and is dispersed in the resin of a sliding member. Contrary to the conventional spherical graphite, the present graphite has a high degree of graphitization and is almost natural graphite, and, thus improves lubrication property.

(5) Solid lubricant having cleavage property can enhance seizure resistance (claim 4).

The present invention is further explained by way of the examples.

EXPLANATION OF SYMBOLS

1 Cleavage Plane
2 Graphite Particles

DETAILED DESCRIPTION OF THE INVENTION

Examples and Comparative Examples

The production methods according to examples and comparative examples are described hereinafter.

A 1.5 mm thick plain steel sheet was subjected to degreasing. Copper alloy powder was dispersed on the plain steel sheet to form a roughened surface portion. No particular limitation is imposed on the kind of the copper alloy powder, which may be Cu—Sn powder, Cu—Sn—Bi powder, or the like. The powder used may have a largest particle diameter 75 to 180 μm. The sliding layer formed on the roughened surface portion and a steel sheet must be tightly bonded with each other. In the light of bonding, desirable particle diameter of the powder used is 106 to 150 μm. The powder is sprayed on a steel sheet in an amount of 0.05 to 0.1 g per $cm^2$. Sintering temperature depends on the kind of powder and ranges from 800 to 1000 degrees C. Porosity of a 150 μm thick roughened surface portion was calculated as 40 to 80%.

The components of a sliding layer, whose composition is shown in Table 1, were thoroughly mixed with solvent, followed by impregnation into the roughened surface portion. The solvent was thoroughly removed by drying at 100 to 200 degrees C. Finally, baking was carried out at 300 to 400 degrees C. As a result, a 100 to 150 μm thick sliding layer was formed. The resultant bimetal material was cut and bent into a bush form. The sliding layer was then machined. A wear test and a seizure test were carried out.

Figure 1:
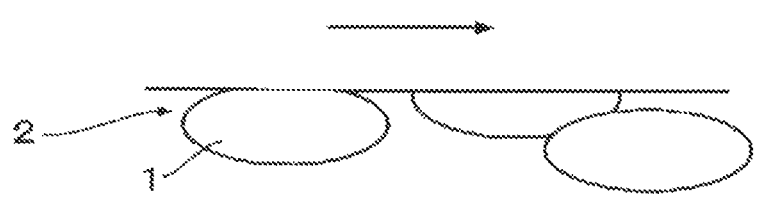
FIG. 1 A schematic drawing illustrating that the cleavage plane of graphite and the sliding direction are coincident with each other.
Figure 2:
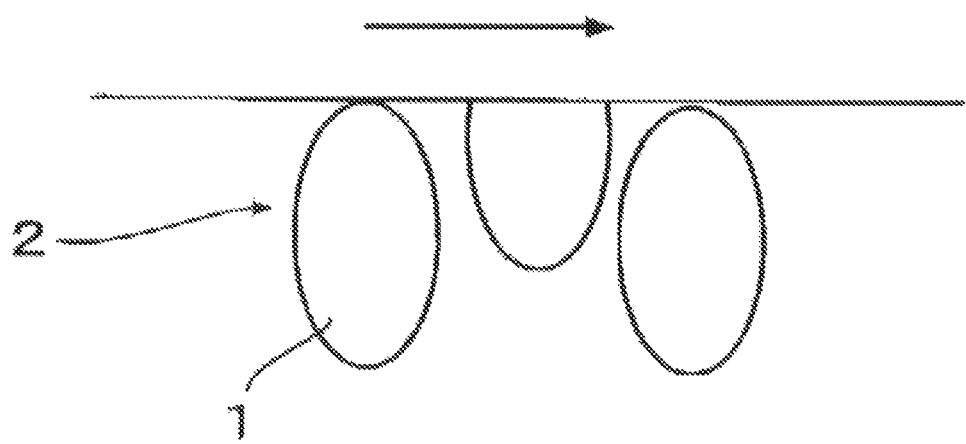
FIG. 2 A schematic drawing illustrating that the cleavage plane of graphite and the sliding direction are perpendicular to each other.
Figure 3:
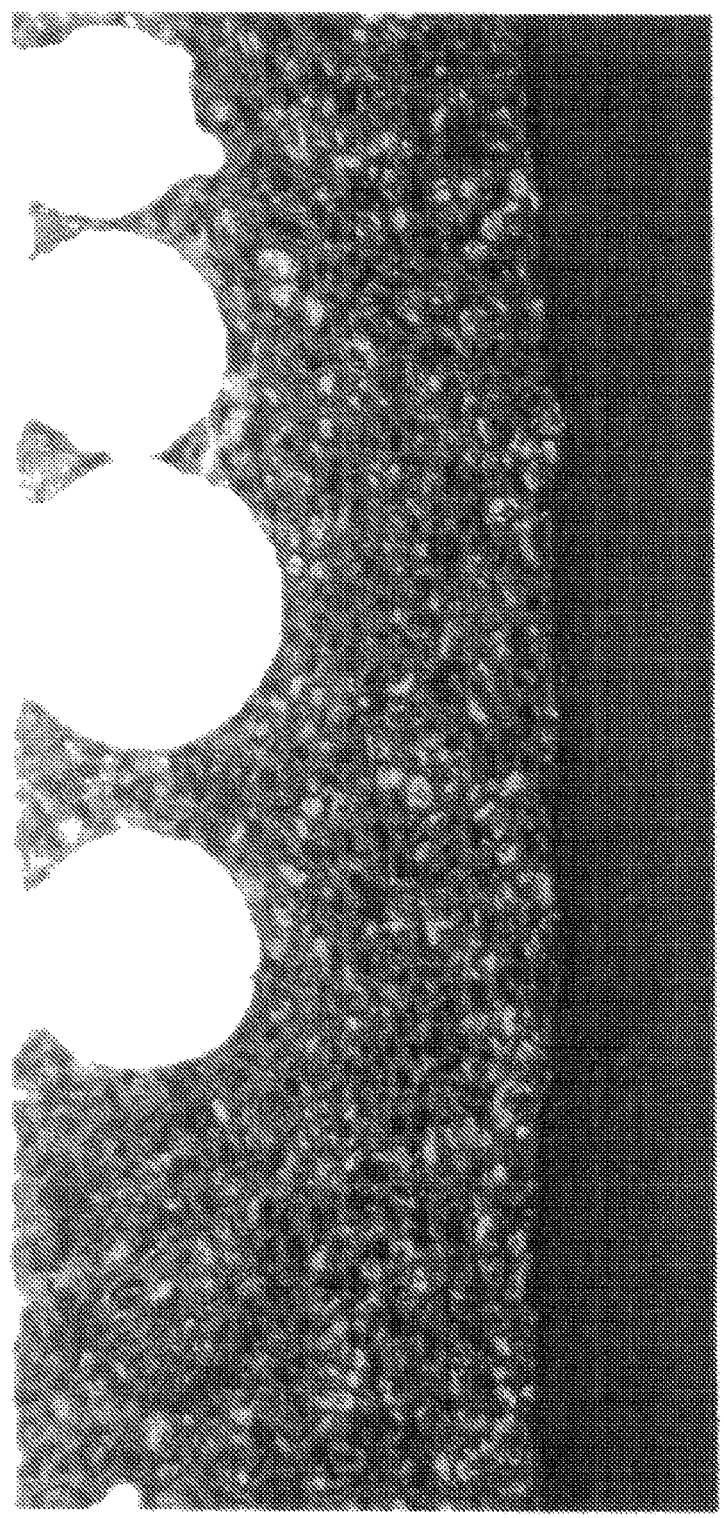
FIG. 3 A microscopic photograph showing the cross section of a sliding material according to an example of the present invention.

By reference to FIG. 3, a cross sectional structure of Example 14 of Table 1 is shown. In FIG. 3, sintered metallic particles are bonded on the backing metal. The sliding layer consists of the present graphite particles (gray particles) and resin (black portion). The sliding layer is baked on the sintered metallic particles. The present graphite particles have an average particle ratio of 0.6 and a presence ratio of 72%, and, therefore, satisfy the requirements of claim 1 of the present invention. The present graphite of Table 1 is a product CGB-10 of Japan Graphite Co., Ltd.

In the cross sectional structure of Comparative Example 2, much graphite has a particle ratio of less than 0.5%, and a presence ratio of 50%.

Wear Resistance Test

Tester: plate-on-ring tester
Lubrication: liquid paraffin
Load: 507 kgf (constant)
Speed: 5 m/s
Testing Time: 60 minutes
Evaluation Method: wear depth after test
Seizure Resistance Test
Tester: thrust tester
Lubrication: liquid paraffin
Load: successive increase of load
Speed: 10 m/s
Testing Time: 60 minutes Evaluation Method: The Surface pressure, at which seizure occurred, was used for the evaluation.
Test results are shown in Table 1.
[Table 1]

referred to as "particle ratio") of 0.5 or more amounts to 50% or more of the total number of the graphite particles observed in a photograph of an optional cross section of the sliding material based on graphite-added resin.

TABLE 1

| | | Average Particle Diameter μm | Degree of Graphitization | Graphite Shape | | Composition | | | | | | | | Properties | |
|---|---|---|---|---|---|---|---|---|---|---|---|---|---|---|---|
| | | | | | | Resin | | Friction Adjusting Agent | | | Solid Lubricant | | | Wear Resistance Wear Amount | Seizure Resistance Seizure Surface Pressure |
| Classification | No. | | | Present Graphite | Scale Form | PI | PAI | Clay | Mullite | Talc | PTFE | $MoS_2$ | BN | μm | MPa |
| Comparative Example | 1 | 15 | 0.30 | 40 | | 15 | 15 | 15 | | | 15 | | | 2 | 28 |
| | 2 | 30 | 0.75 | | 50 | 25 | 25 | | | | | | | 26 | 38 |
| | 3 | 30 | 0.30 | | 50 | 25 | 25 | | | | | | | 35 | 15 |
| | 4 | 45 | 0.75 | | 10 | 5 | 40 | | 5 | | 10 | | | 33 | 28 |
| | 5 | 2 | 0.75 | | 25 | 30 | 30 | | 15 | | | | | 25 | 36 |
| Inventive Example | 1 | 5 | 0.65 | 50 | | 10 | 10 | | 10 | | | | 20 | 6 | 50 |
| | 2 | 15 | 0.67 | 60 | | 35 | 5 | | | | | | | 20 | 48 |
| | 3 | 15 | 0.67 | 30 | | 10 | 20 | | 20 | | 20 | | | 15 | 60 or more |
| | 4 | 23 | 0.73 | 40 | | 20 | 5 | 20 | | | 15 | | | 3 | 60 or more |
| | 5 | 45 | 0.75 | 50 | | 25 | 25 | | | | | | | 15 | 42 |
| | 6 | 45 | 0.75 | 25 | | 30 | 30 | | 15 | | | | | 7 | 52 |
| | 7 | 5 | 0.85 | 60 | | 15 | 15 | | | | 10 | | | 16 | 52 |
| | 8 | 5 | 0.85 | 30 | | 20 | 20 | | | | | 30 | | 18 | 58 |
| | 9 | 32 | 0.82 | 20 | | 15 | 20 | | 20 | | | | 25 | 13 | 52 |
| | 10 | 10 | 0.93 | 30 | | 20 | 5 | | 5 | | 40 | | | 6 | 60 or more |
| | 11 | 10 | 0.93 | 35 | | 15 | 15 | 15 | | | 20 | | | 4 | 60 or more |
| | 12 | 10 | 0.93 | 30 | | 25 | 25 | 5 | | | | 15 | | 8 | 46 |
| | 13 | 20 | 0.95 | 5 | | 50 | | | 20 | | | 25 | | 8 | 60 or more |
| | 14 | 20 | 0.95 | 30 | | 20 | 20 | 10 | | | 20 | | 40 | 5 | 60 or more |
| | 15 | 20 | 0.95 | 15 | | 35 | 5 | | | 5 | | | | 19 | 56 |
| | 16 | 45 | 0.94 | 45 | | 5 | 40 | 10 | | | | | | 5 | 46 |
| | 17 | 45 | 0.94 | 10 | | 5 | 40 | | 5 | | 40 | | | 15 | 60 or more |

As compared with the graphite of Example 14, the graphite of Comparative Example 1 has a lower degree of graphitization and higher hardness. Graphite shape of the graphite of Comparative Example 2 is scale form. The particle ratio of this comparative example is less than that of Example 17. In Comparative Example 1, the present graphite is used. Surface roughness of Comparative Example 1 and Examples is Ra 0.3 to 0.8 μm, while the surface roughness Ra of Comparative Examples 2 through 5, in which the scale-form graphite is used, is 1.0 μm or more.

INDUSTRIAL APPLICABILITY

As is described hereinabove, the sliding material based on graphite-added resin has improved seizure resistance. Therefore, it can be advantageously used for bearings of a fuel pump, engines and transmissions, a bearing and a washer of auxiliary parts of suspension, such as a shock absorber, a bearing and washer of general machines, and the like.

The invention claimed is:

1. A sliding material based on graphite-added resin containing 5 to 60% by weight of graphite particles having an average particle diameter of from 5 to 50 μm, and a degree of graphitization of 0.6 or more, with the balance being one or more of polyimide resin and polyamide-imide resin, and further, the number of the graphite particles having a minimum diameter/maximum diameter ratio (hereinafter referred to as "particle ratio") of 0.5 or more amounts to 50% or more of the total number of the graphite particles observed in a photograph of an optional cross section of the sliding material based on graphite-added resin.

2. A sliding material according to claim 1, wherein said graphite is natural graphite.

3. A sliding material based on graphite-added resin according to claim 1, wherein the degree of graphitization of said graphite is 0.8 or more.

4. A sliding material based on graphite-added resin according to claim 1, further containing 0.5 to 20% by weight of one or more friction adjusting agent selected from clay, mullite or talc having a particle diameter of less than 10 μm, with a proviso that the total amount of friction adjusting agent and graphite is from 5.5 to 80% by weight.

5. A sliding material based on graphite-added resin according to claim 1, further containing 1 to 40% by weight of one or more solid lubricants selected from PTFE, $MoS_2$ and BN, with a proviso that the total amount of graphite and friction-adjusting agent amounts to 6.5 to 80% by weight.

6. A sliding member, wherein a graphite-added sliding material according to claim 1 is formed, by sintering, on backing metal.

7. A sliding member according to claim 6, wherein a surface roughness of said graphite-added resin-based material is adjusted by machining.

8. A sliding material based on graphite-added resin according to claim 2, wherein the degree of graphitization of said graphite is 0.8 or more.

9. A sliding material based on graphite-added resin according to claim 2, further containing 0.5 to 20% by weight of one or more friction adjusting agent selected from clay, mullite or talc having a particle diameter of less than 10 μm, with a proviso that the total amount of friction adjusting agent and graphite is from 5.5 to 80% by weight.

10. A sliding material based on graphite-added resin according to claim 3, further containing 0.5 to 20% by weight of one or more friction adjusting agent selected from clay, mullite or talc having a particle diameter of less than 10 μm, with a proviso that the total amount of friction adjusting agent and graphite is from 5.5 to 80% by weight.

11. A sliding material based on graphite-added resin according to claim 2, further containing 1 to 40% by weight of one or more solid lubricants selected from PTFE, $MoS_2$ and BN, with a proviso that the total amount of graphite and friction-adjusting agent amounts to 6.5 to 80% by weight.

12. A sliding material based on graphite-added resin according to claim 3, further containing 1 to 40% by weight of one or more solid lubricants selected from PTFE, $MoS_2$ and BN, with a proviso that the total amount of graphite and friction-adjusting agent amounts to 6.5 to 80% by weight.

13. A sliding material based on graphite-added resin according to claim 4, further containing 1 to 40% by weight of one or more solid lubricants selected from PTFE, $MoS_2$ and BN, with a proviso that the total amount of graphite and friction-adjusting agent amounts to 6.5 to 80% by weight.

14. A sliding member, wherein a graphite-added sliding material according to claim 2 is formed, by sintering, on backing metal.

15. A sliding member, wherein a graphite-added sliding material according to claim 3 is formed, by sintering, on backing metal.

16. A sliding member, wherein a graphite-added sliding material according to claim 4 is formed, by sintering, on backing metal.

17. A sliding member, wherein a graphite-added sliding material according to claim 5 is formed, by sintering, on backing metal.

* * * * *